No. 776,264. Patented November 29, 1904.

UNITED STATES PATENT OFFICE.

ALBRECHT SCHMIDT AND FRITZ BETHMANN, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

BLUE SULFUR DYE AND PROCESS OF MAKING SAME.

SPECIFICATION forming part of Letters Patent No. 776,264, dated November 29, 1904.

Application filed March 3, 1903. Serial No. 146,001. (Specimens.)

*To all whom it may concern:*

Be it known that we, ALBRECHT SCHMIDT, Ph. D., and FRITZ BETHMANN, Ph. D., citizens of the Empire of Germany, residing at Höchst-on-the-Main, Germany, have invented certain new and useful Improvements in the Manufacture of Blue Sulfurized Dyestuffs, of which the following is a specification.

We have found that by heating dialkyl-para-amido-para-$^1$-oxy-meta$^1$-chlordiphenyl-amins with sulfur and alkali sulfids in the proportion of more than one part, by weight, of sulfur to four parts of sulfid of an alkali metal, (French Patent No. 303,524,) preferably in presence of a solvent at a temperature of below 100° centigrade, they are transformed into clear blue sulfurized dyestuffs of greater intensity and more valuable properties than the dyestuffs obtained by said French patent. Our dyestuffs have proved to be free from chlorin. The parent materials may be obtained, for instance, by oxidizing diethyl-para-phenylenediamin with ortho-chlorphenol and reducing the chlorinated indophenol thus obtained.

Example I: Sixty parts, by weight, of dimethyl-para-amido-para$^1$-oxy-meta$^1$-chlordi-phenylamin (about eighty-two parts of moisture) are heated in a reflux apparatus with two hundred parts of sodium sulfid, sixty parts of glycerin, eighty-four parts of sulfur, and twenty parts of water, preferably in the presence of some alcohol. The limit of inside temperature is about 94°. Soon there is a rapid elimination of hydrogen sulfid and separation of the product. After about twenty hours the mixture is diluted with water, when the product separates completely. The latter is filtered and washed. The dyestuff needs no further purification. It is diluted only with sulfur, but dyes, even in the raw unpurified state, a blue of very clear indigo-like shade. The dyestuff freed from sulfur by redissolving in the usual manner is a violet-black powder insoluble in water, which on rubbing assumes a metallic luster. Concentrated sulfuric acid dissolves it to a blue solution, also alcohol, but only in slight degree. Sulfids of alkali metals dissolve it easily when hot.

For dimethyl-para-amido-para$^1$-oxy-meta$^1$-chlordiphenylamin, though less advantageous, may be substituted the corresponding indophenol. The corresponding diethylamido compound behaves in a similar manner.

Example II: Ninety-eight parts of phenol are dissolved in one hundred and eighteen parts of concentrated caustic-soda lye and two thousand parts of water. Into this solution is run the calculated quantity of chlorid of lime, (one-half molecular proportion of chlorid of lime for one molecular proportion of phenol.) After the chlorination the solution containing chlorphenol is separated by filtration, with or without previous precipitation of the dissolved lime with sodium carbonate, &c. The alkaline solution is then mixed with the dimethyl-para-phenylenediamin solution obtained from one hundred and fifty parts of nitroso-dimethylanilin after having neutralized the greater part of the caustic alkali formed, and this in such a manner that the chlorphenol remains still dissolved in the alkaline solution. Then is run in while stirring and cooling at about 10° centigrade a solution of sodium hypochlorite until the oxidation is complete. The chlorindophenol is allowed to deposit, filtered, and reduced by heating with a solution of sodium sulfid to dimethyl-para-amido-para$^1$-oxy-meta$^1$-chlordi-phenylamin. The indophenol thus obtained may also directly be introduced into the sodium-sulfid mass.

Example III: Dyestuffs apparently identical with the above may be obtained if for the chlorinated indophenols the corresponding chlorinated indophenolthiosulfonic acid is used, which is easily obtained by oxidizing, for instance, dimethyl-para-phenylenediamin-thiosulfonic acid with ortho-chlorphenol and by isolating the chlorinated beautifully-crystallized indophenolthiosulfonic salt in the usual manner.

Having now described our invention, what we claim is—

1. The herein-described process for the manufacture of blue sulfurized dyestuffs, which consists in heating dialkyl-para-amido-para$^1$-oxy-meta$^1$-chlordiphenylamin with sulfur and sulfids of alkali metals in the proportion of more than one part of sulfur to four parts of crystallized sodium sulfid.

2. The herein-described process for the manufacture of blue sulfurized dyestuffs, which consists in heating the corresponding indophenols or thiosulfonic acids of dialkyl-para-amido-para$^1$-oxy-meta$^1$-chlordiphenylamin with sulfur and sulfids of alkali metals in the proportion of more than one part of sulfur to four parts of crystallized sodium sulfid in the presence of a solvent.

3. As new products, the herein-described sulfurized dyestuffs, being blue-black powders, easily soluble in warm sulfids of alkali metals, soluble in sulfuric acid with a dark-blue color, slightly soluble in alcohol with a red-violet fluorescent color, almost insoluble in glacial acetic acid and dyeing unmordanted cotton blue in a sulfur alkaline bath.

In testimony that we claim the foregoing as our invention we have signed our names in presence of two subscribing witnesses.

ALBRECHT SCHMIDT.
FRITZ BETHMANN.

Witnesses:
ALFRED BRISBOIS,
BERNHARD LEYDECKER.